Patented Feb. 6, 1934

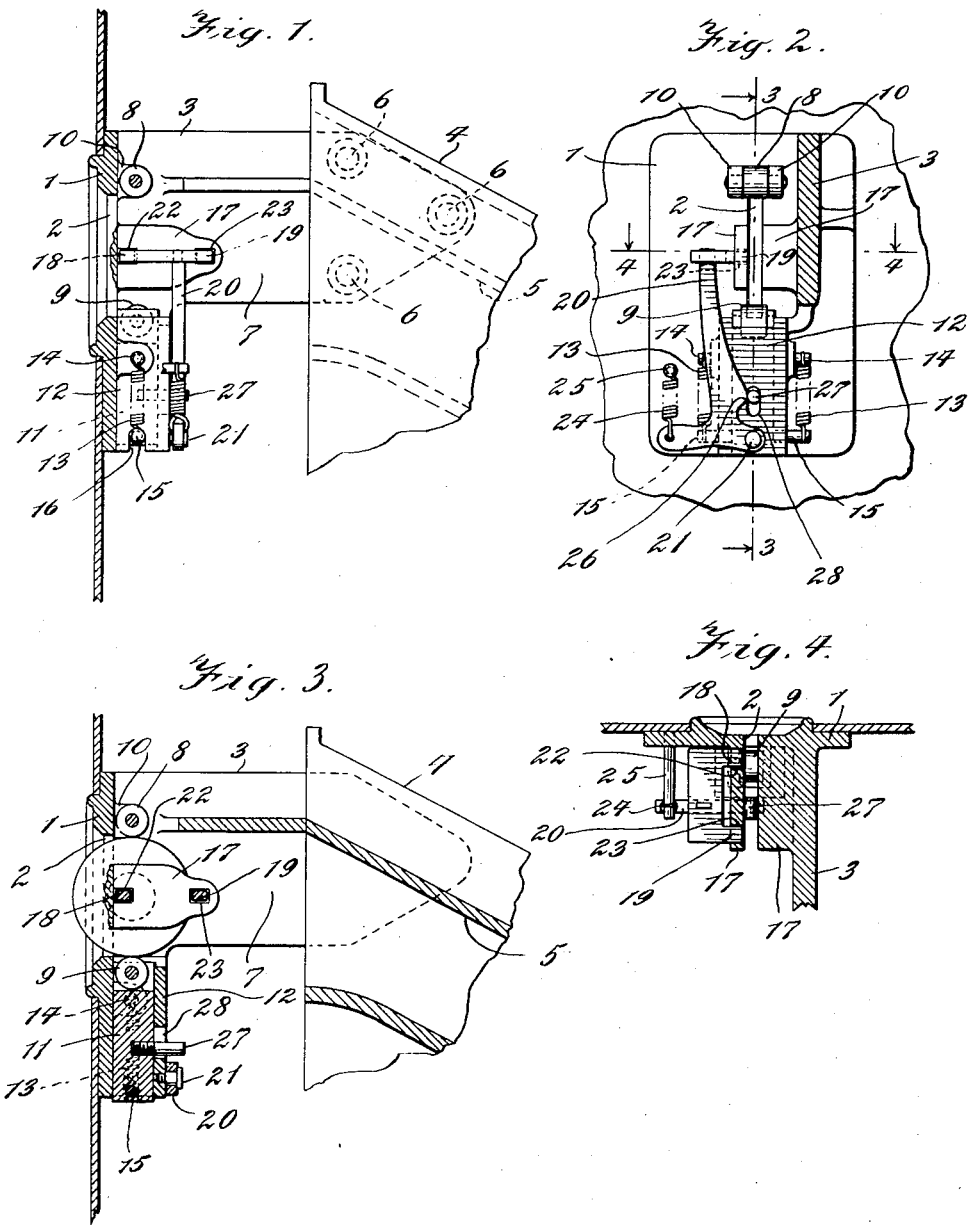

1,945,948

UNITED STATES PATENT OFFICE 1,945,948

PROTECTIVE MEANS FOR COIN CONTROLLED APPARATUS

Louis H. Morin, New York, N. Y., assignor, by mesne assignments, to Doehler Die Casting Co., a corporation of New York Application November 24, 1930
Serial No. 497,769

16 Claims. (Cl. 194—97)

My invention relates to a means for eliminating foreign matter inserted in a check receiving passage, such for example, as the check receiving passage of a coin or check controlled vending machine or change delivering machine.

Automatic vending machines are generally located in places frequented by the public at large such, for example, as hotel lobbies, railroad stations and rest rooms. These machines are commonly left unattended except for the general supervision of the attendant in charge of the place in which the machine is located, and the machines are subjected to much abuse in that foreign matter such as wires, dirt, and like substances are inserted in the check receiving opening of the machine. Although such foreign matter cannot function in the capacity of a check to operate the vending machine, it may, and frequently does, injure or clog the check selecting mechanism or the operating mechanism of the vending machine to such an extent as to render the machine inoperative.

In accordance with my invention, I provide a member with a check receiving passage which member is adapted to be secured to a device having a check conducting passage such, for example, as a check selector or a vending machine, with the check receiving passage of the member in the plane of and spaced from the opening to the check conducting passage of the device so as to form a gap between the check receiving passage of the member and the opening to the check conducting passage of the device through which gap foreign matter will pass under the action of the force of gravity. Checks of the proper size inserted in the check receiving passage of the member are impelled across the gap between the check receiving passage of the member and the check conducting passage of the device and into the check conducting passage.

In combination with the above means for eliminating foreign matter, I may provide a means for preventing checks having an opening therethrough, such, for instance, as washers or rings, from passing through the check receiving passage of the member or entirely entering the passage. Checks having an opening therethrough are prevented from entirely entering the check receiving passage by a projection which is adapted to extend across the plane of the passage into the path of a check entering the passage. Movement of the projection, into and out of the path of a check, is controlled by the surface of the check inserted in the passage. If the surface of the check is broken, such as a check having an opening therethrough, the projection moves into the path of the check and engages the leading edge of the check, thereby preventing the check from moving forwardly through the passage. The projection is so located with respect to the passage that a check engaged by the projection will not entirely enter the passage and may be withdrawn.

Specially, I provide a plate through which there is a check receiving passage or slot. The plate is provided with a lateral bracket which is adapted to be secured to a check selector or directly to a winding machine which is provided with a check conducting passage. The length of the lateral bracket determines the distance between the plate and the opening to the check conducting passage of the device to which the bracket is secured, and consequently, the length of the gap between the check receiving slot of the plate and the opening to the check receiving passage of the device. Through the gap so formed any foreign matter inserted in the check receiving slot of the plate will pass under the action of the force of gravity. The check receiving slot of the plate is mounted in the plane of the opening to the check receiving passage of the device so that a check inserted in the slot in the plate and properly impelled will jump the gap between the slot and the opening to the check conducting passage of the device and enter the check conducting passage. For impelling a check of proper size across the gap, I provide a pair of opposed members which are adapted to engage therebetween a check which is inserted in the check receiving slot in the plate. One of the members is mounted adjacent one end of the check receiving slot in the plate and is stationary with respect to the plate. The other of the members is slidably mounted adjacent the other end of the slot. The slidably mounted member is resiliently urged in a direction towards the stationary member, the distance which the member may move in this direction being limited. When a check of the proper size, in the form of a disc such as a coin, is inserted in the check receiving slot of the plate it is engaged between the pair of opposed members, the slidably mounted member being moved against the action of the resilient means until the center of the check has passed between the members. When the center of the check has passed between the members the force exerted by the resilient means acting on the slidable member is resolved, by virtue of the circular edge of the check, into an impelling force. The impelling force so exerted on a check of proper size is sufficient to impel the check across the gap and into the check conducting passage of the device.

In conjunction with the check impelling mechanism a pair of projections are carried by a lever for preventing a spurious check having an opening therethrough from entering the check receiving slot. The lever is pivotally mounted on the plate so that one of the projections is adjacent the slot in the plate and the other is spaced therefrom, the two projections being connected together and adapted by virtue of the pivotal connection of the lever to move into and out of the plane of the check receiving slot in the plate. The lever is resiliently urged to a position in which the projections carried thereby traverse the plane of the check receiving slot of the plate. A cam face is formed on the lever and engages a lateral extension on the slidable member of the aforementioned pair of impelling members. The relation of the cam surface on the lever to this extension is such that when the slidable member is in its normal position, the projections carried by the lever are removed from the plane of the check receiving slot. When a check is inserted in the slot and forces the slidable member in a direction opposite to the stationary member of the aforementioned pair of members, the lever is released and tends to move the projections carried thereby across the plane of the check receiving slot. The projection adjacent the slot, however, will engage the surface of the check inserted into the slot, and if the surface is broken, such, for instance, as in the case of a washer or ring, the two projections will traverse the plane of the slot and the projection spaced from the slot will engage the leading edge of the check having an opening therethrough, and prevent the check from entirely entering the slot. A check stopped by the projections may be withdrawn from the slot. Upon withdrawing the check the lever will be moved by the extension on the slidable member to a position in which the projections are removed from the plane of the slot.

A more clear understanding of my invention will be had from the following particular description of one embodiment thereof which is shown in the accompanying drawing, in which:

Fig. 1 is an elevation, partly in section, of a device embodying my invention;

Fig. 2 is a rear elevation of the same;

Fig. 3 is a sectional elevation taken on the line 3—3 of Fig. 2 and showing the relation of the parts when a check is in the check receiving passage; and, Fig. 4 is a transverse section taken on the line 4—4 of Fig. 2.

In the embodiment shown in the drawing, there is a plate 1 having a check receiving slot 2 passing therethrough. A lateral bracket or arm 3 is formed integral with one side of the plate. This arm is provided for securing the plate to a device 4 having a check conducting passage 5. The device 4 may be a check selector which is used in conjunction with a vending machine or a check operated vending or change making machine. The bracket 3 may be secured to the device 4 by means of screws 6, and it is secured to the device in the position in which the check receiving slot 2 is contained in the plane of the opening to the check conducting passage 5. The check receiving slot is spaced from the opening to the check conducting passage a distance equal to substantially the length of the arm 3 to form a gap 7 therebetween through which foreign matter such as dirt or wires inserted in the check receiving slot will pass under the action of the force of gravity, and through which any object inserted in the check receiving slot will pass unless it is impelled across the gap to the check conducting passage.

In the device shown, a means is provided for impelling a check of proper size across the gap and into the check conducting passage. For impelling a check of proper size across the gap between the check receiving slot in the plate and the check conducting passage in the device there is provided a pair of opposed rollers 8 and 9. The roller 8 is mounted adjacent one end of the slot between two lugs 10 extending laterally from the plate and formed integral therewith. The roller 9 is carried by a bracket 11 which is slidably mounted in a housing 12 formed on the plate 1 at the end of the slot 2 opposite to the roller 8. The housing 12 is open at both ends so that the roller 9 may extend above the housing and into the path of a check inserted into the check receiving slot. The roller 9 is maintained in the path of a check entering the check receiving slot by two convolute springs 13 on either side of the housing 12. These springs engage, at one end, projections 14 secured to the housing, and at the opposite end a pin 15 which extends through the slidable bracket and slots 16 formed in the sides of the housing. The base of the slots formed in the sides of the housing, by engaging the pin 15, limits the movement of the slidable bracket in the direction of the stationary roller 8.

Operation of the mechanism described above is as follows: when a check of circular configuration such, for example, as a coin, and of proper diameter is inserted in the slot 2, it is engaged between the rollers 8 and 9. As the check is pushed into the slot the slidable bracket 11 is moved against the force of the springs 13, the roller 8 restraining the check against movement in a direction longitudinally of the slot. As the center of the check passes the center line of the rollers 8 and 9, the force of the springs 13 is exerted upon the rearward, inclined surface of the check and is resolved into a plurality of forces, one of which acts in a direction parallel to the direction of movement of the check and impels the check through the slot. The impelling force so exerted by the springs 13 is sufficient to cause a check of proper diameter to jump the gap between the slot and the check receiving passage of the device and enter the check receiving passage. Projections 17 extending laterally from the plate 1 may be provided on either side of the slot to direct the movement of a check passing through the slot.

In conjunction with the mechanism for impelling the check across the gap, I provide means for preventing checks having an opening therethrough such, for instance, as washers or rings, from entirely entering the check receiving slot of the plate. This means consists of a pair of projections 18 and 19 which are formed on a member that is secured to a lever 20 which is pivotally mounted on the plate by means of a pivot 21. The projections are adapted to extend through openings 22 and 23 in one of the projections 17 and traverse the plane of the check receiving slot, to which position they are resiliently urged by the spring 24 secured at one end to the lever 20 and at the opposite end to a pin 25 secured to the plate 1. The lever is provided with a cam surface 26 which engages an extension 27 in the form of a pin extending laterally from the slidably mounted bracket and passing through a slot 28 provided therefor in the side of the housing 12. The relation of the cam surface of the lever and the extension 27 is such that the projections are held in the position in which they are withdrawn from the plane of the check receiving slot when the slidable bracket 11 is in the normal position.

As a coin is inserted in the slot, the slidable bracket 11 is moved, and the lever 20 is permitted to move under the action of the spring 24 so as to move the projections towards the path of the check inserted in the check receiving slot. As the projections move toward the slot, the projection 18 adjacent the slot engages the surface of the check and thereafter the surface of the check controls further movement of the pair of projections when the check is pushed through the slot. If the surface of the check is unbroken, the surface of the check will slide along the projections without the projections materially interfering with the passage of the check. If, however, the surface of the check is broken, such as when the check has an opening therethrough, the projection 18 adjacent the slot will pass into the opening and the other projection 19 will extend across the path of the check engaging the leading edge of the check to prevent the check from entirely entering the slot. A check so prevented from entering the slot will extend from the slot on the outer side of the plate sufficiently so that it may be withdrawn. It will be seen that the insertion of the check controls the relation of the lever and action of the projections 18 and 19 and after a check has been inserted the surface of the check controls the action of the projection 19 which is adapted to traverse the path of the check and engage the leading edge thereof.

From the above description of the embodiment of my invention shown in the drawing, it will be apparent to those skilled in the art that I have provided a means for eliminating foreign matter inserted into a check receiving passage or slot of a coin selector or vending machine which means is universal in its application in that it is applicable to any type of machine which is check or coin controlled. The means provided eliminates the foreign matter immediately behind the check receiving slot, thereby avoiding any possibility of the substance inserted in the check receiving slot from clogging or affecting the check selector or vending machine operating mechanism.

It is obvious that various changes may be made in the details of the embodiment shown in the drawing and described, in detail, immediately above within the principle and scope of my invention as expressed in the appended claims.

I claim:

1. In combination, a check selector and means for eliminating foreign matter inserted in a check receiving passage comprising a member having a check receiving passage therethrough and adapted to be secured to a device having a check conducting passage with the check receiving passage of the member in the plane of the opening to the check conducting passage of the device and spaced therefrom to form a gap therebetween through which foreign matter inserted in the check receiving passage may pass under the action of the force of gravity, means for impelling a check entering the check receiving passage of the member across the gap between the check receiving passage of the member and the check conducting passage of the device, and means for restraining a check having an opening therethrough against the action of said impelling means.

2. In combination, a check selector and means for eliminating foreign matter inserted in a check receiving passage comprising a member having a check receiving passage therethrough and adapted to be secured to a device having a check conducting passage with the check receiving passage of the member in the plane of the opening to the check conducting passage of the device and spaced therefrom to form a gap therebetween through which foreign matter inserted in the check receiving passage may pass under the action of the force of gravity, means for impelling a check entering the check receiving passage of the member across the gap between the check receiving passage of the member and the check conducting passage of the device, and means for restraining a check having an opening therethrough against the action of said impelling means including a projection adapted to extend across the path of the check.

3. In combination, a check selector and means for eliminating foreign matter inserted in a check receiving passage comprising a member having a check receiving passage therethrough and adapted to be secured to a device having a check conducting passage with the check receiving passage of the member in the plane of the opening to the check conducting passage of the device and spaced therefrom to form a gap therebetween through which foreign matter inserted in the check receiving passage may pass under the action of the force of gravity, means for impelling a check entering the check receiving passage of the member across the gap between the check receiving passage of the member and the check conducting passage of the device, means for restraining a check having an opening therethrough against the action of the impelling means including a projection adapted to traverse the path of a check, resilient means urging the projection in a direction substantially lateral to the check receiving passage, means for restraining the action of the resilient means acting on the projection, and means actuated by the check impeling means for releasing the resilient means acting on the projection.

4. In combination, a check selector and means for eliminating foreign matter inserted in a check receiving passage comprising a member having a check receiving passage therethrough and adapted to be secured to a device having a check conducting passage with the check receiving passage of the member in the plane of the opening to the check conducting passage of the device and spaced therefrom to form a gap therebetween through which foreign matter inserted in the check receiving passage may pass under the action of the force of gravity, means for impelling a check entering the check receiving passage of the member across the gap between the check receiving passage of the member and the check conducting passage of the device, means for restraining a check having an opening therethrough against the action of the impelling means including a projection adapted to traverse the path of a check, resilient means urging the projection in a direction substantially lateral to the check receiving passage, means for restraining the action of the resilient means acting on the projection, means actuated by the check impelling means for releasing the resilient means acting on the projection, and means actuated in accordance with the surface of the check inserted in the check receiving passage for controlling the action of the projection.

5. A check selector comprising a member having a check receiving passage therethrough, and means for preventing a check having an opening therethrough from entirely entering the check receiving passage of the member including a projection movably mounted for movement in a direction substantially lateral to the plane of the check receiving passage and adapted to extend into the check receiving passage and engage the leading edge of a check having an opening therethrough, means for moving the projection into the check receiving passage, and means for maintaining the projection out of the path of checks other than those having an opening therethrough.

6. A check selector comprising a member having a check receiving passage therethrough and means for preventing a check having an opening therethrough from entirely entering the check receiving passage including a pair of spaced projections, the projections being movably mounted for movement in a direction substantially lateral to the plane of the check receiving passage, and one of the projections being adjacent the opening to the check receiving passage and adapted to enter an opening in a check having an opening therethrough and the other projection being removed from the opening to the check receiving passage and adapted to extend into the passage and engage the leading edge of a check.

7. A check selector comprising a member having a check receiving passage therethrough, and means for preventing a check having an opening therethrough from entirely entering the check receiving passage of the member including a pair of spaced projections, the projection being movably mounted for movement in a direction substantially lateral to the plane of the check receiving passage and one of the projections being adjacent the opening to the check receiving passage and adapted to enter an opening in a check and the other projection being removed from the opening to the check receiving passage and adapted to extend into the passage and engage the leading edge of a check having an opening therethrough, resilient means urging the projections toward the check receiving passage, and means for causing the projections to move into the check receiving passage in unison.

8. A check selector comprising a member having a check receiving passage therethrough, and means for preventing a check having an opening therethrough from entering the check receiving passage including a pair of spaced projections secured together, the projections being movably mounted for movement in a direction substantially lateral to the plane of the check receiving passage and one of the projections being mounted adjacent the opening to the check receiving passage and adapted to enter an opening in a check having an opening therethrough and the other projection being removed from the opening to the check receiving passage and adapted to extend into the passage and engage the leading edge of a check having an opening therethrough, and resilient means urging the projections toward the plane of the check receiving passage.

9. A check selector comprising a member having a check receiving passage therethrough, and means for preventing a check having an opening therethrough from entering the check receiving passage including a pair of spaced projections secured together, the projections being movably mounted for movement in a direction substantially lateral to the plane of the check receiving passage and one of the projections being mounted adjacent the opening to the check receiving passage and adapted to enter an opening in a check having an opening therethrough and the other projection being removed from the opening to the check receiving passage and adapted to extend into the passage and engage the leading edge of a check having an opening therethrough, resilient means urging the projections toward the plane of the check receiving passage, and means actuated by a check inserted in the check receiving passage for controlling the movement of the projections.

10. A check selector comprising a plate having a check receiving slot therethrough, a lever pivotally mounted on the plate, a pair of spaced projections carried by said lever, one of said projections being mounted adjacent the slot in said plate and adapted to extend across the plane of the slot and into an opening in a check having an opening therethrough and the other projection being spaced from the plate and adapted to extend across the plane of the slot and engage the leading edge of a check having an opening therethrough to prevent the check from entirely entering the check receiving slot, resilient means acting on said lever to cause it to move about its pivot and cause the projections to extend across the plane of the check receiving slot, a cam surface on the lever, a member slidably mounted on said plate extending adjacent one end of the slot and adapted to be engaged by the edge of a check inserted in the slot, resilient means acting to urge the member into the path of a check, and a lateral extension on said member engaging the cam on the lever carrying the pair of projections for controlling the movement of the projections.

11. In combination, a check selector and means for eliminating foreign matter inserted in a check receiving passage comprising a plate having a check receiving slot therethrough and adapted to be secured to a device having a check conducting passage with the slot in the member in the plane of the opening to the check conducting passage of the device and spaced therefrom to form a gap therebetween through which foreign matter inserted in the check receiving slot may pass under the action of the force of gravity, a roller mounted on the plate at one end of the slot, a second roller carried by a bracket slidably mounted on the plate, the second mentioned roller being opposite the first mentioned roller and the two rollers being adapted to engage a check therebetween, resilient means urging said slidably mounted bracket toward said first mentioned roller for impelling a check engaged between the rollers across the gap to the check conducting passage of the device, a lateral extension on the slidably mounted bracket, a lever pivotally mounted on said plate, a pair of projections on the lever adapted to extend into the path of a check inserted in the slot in the plate, resilient means acting on said lever for urging the projections into the plane of the slot in the plate, and a cam surface on the lever engaging the lateral extension on the slidably mounted bracket.

12. In combination, a check selector and means for eliminating foreign matter inserted in a check receiving passage comprising a member having a check receiving passage therethrough and adapted to be secured to a device having a check conducting passage with the check receiving passage of the member in the plane of the opening to the check conducting passage of the device and spaced therefrom to form a gap therebetween through which foreign matter inserted in a check receiving passage may pass under the action of the force of gravity, means for impelling a check entering the check receiving passage of the member across the gap between the check receiving passage of the device, means for restraining a check having an opening therethrough against the action of the impelling means including a projection adapted to traverse the path of a check, said projection being normally withdrawn from the path of a check, and means operative upon the insertion of a check in the check receiving passage to cause said projection to move in a direction to traverse the path of the check.

13. In combination, a check selector and means for eliminating foreign matter inserted in a check receiving passage comprising a member having a check receiving passage therethrough and adapted to be secured to a device having a check conducting passage with the check receiving passage of the member in the plane of the opening to the check conducting passage of the device and spaced therefrom to form a gap therebetween through which foreign matter inserted in a check receiving passage may pass under the action of the force of gravity, means for impelling a check entering the check receiving passage of the member across the gap between the check receiving passage of the device, means for restraining a check having an opening therethrough against the action of the impelling means including a projection adapted to traverse the path of a check, resilient means urging the projection in a direction substantially lateral to the check receiving passage, means for restraining the action of the resilient means and holding the projection out of the path of a check, and releasing means operative to release said restraining means when a check in the check receiving passage is at the point said projection traverses the path of a check.

14. In combination, a check selector and means for eliminating foreign matter inserted in a check receiving passage comprising a member having a check receiving passage therethrough and adapted to be secured to a device having a check conducting passage with the check receiving passage of the member in the plane of the opening to the check conducting passage of the device and spaced therefrom to form a gap therebetween through which foreign matter inserted in the check receiving passage may pass under the action of the force of gravity, impelling means for causing a check entering the check receiving passage of the member to jump the gap between the check receiving passage of the member and the check conducting passage of the device, and restraining means controlled by said impelling means for restraining a check having an opening therethrough against the action of said jumping means.

15. In combination, check impelling and selecting means comprising a plate having a check-receiving slot therethrough, a roller mounted between stationary brackets at one end of said slot, a housing formed on the plate adjacent the other end of the slot and having a slot formed therein, a bracket slidably mounted in the housing, a roller carried by said bracket adjacent the end of the check receiving slot, resilient means urging the bracket in the direction of the stationary roller, a projection extending from said bracket through the slot in the housing, a lever pivoted to said plate, a projection carried by said lever and adapted to extend across the path of a check entering the check receiving slot, resilient means acting on the lever urging the lever in a direction to cause the projection to extend across the path of a check, and a cam surface on said lever bearing against the projection on the slidably mounted bracket.

16. A check selector comprising a member having a check receiving passage therethrough, and means for preventing a check having an opening therethrough from entering the check receiving passage including a projection movably mounted for movement in a direction substantially lateral to the plane of the check receiving passage and adapted to extend into the check receiving passage and engage the leading edge of a check having an opening therethrough, and means actuated by a check inserted in the check receiving passage for controlling the movement of the projection.

LOUIS H. MORIN.